Oct. 2, 1962 R. W. HUTTON 3,056,859
CONVERSATION-TIMING REVERTING-CALL TELEPHONE SYSTEM
Filed Jan. 22, 1957
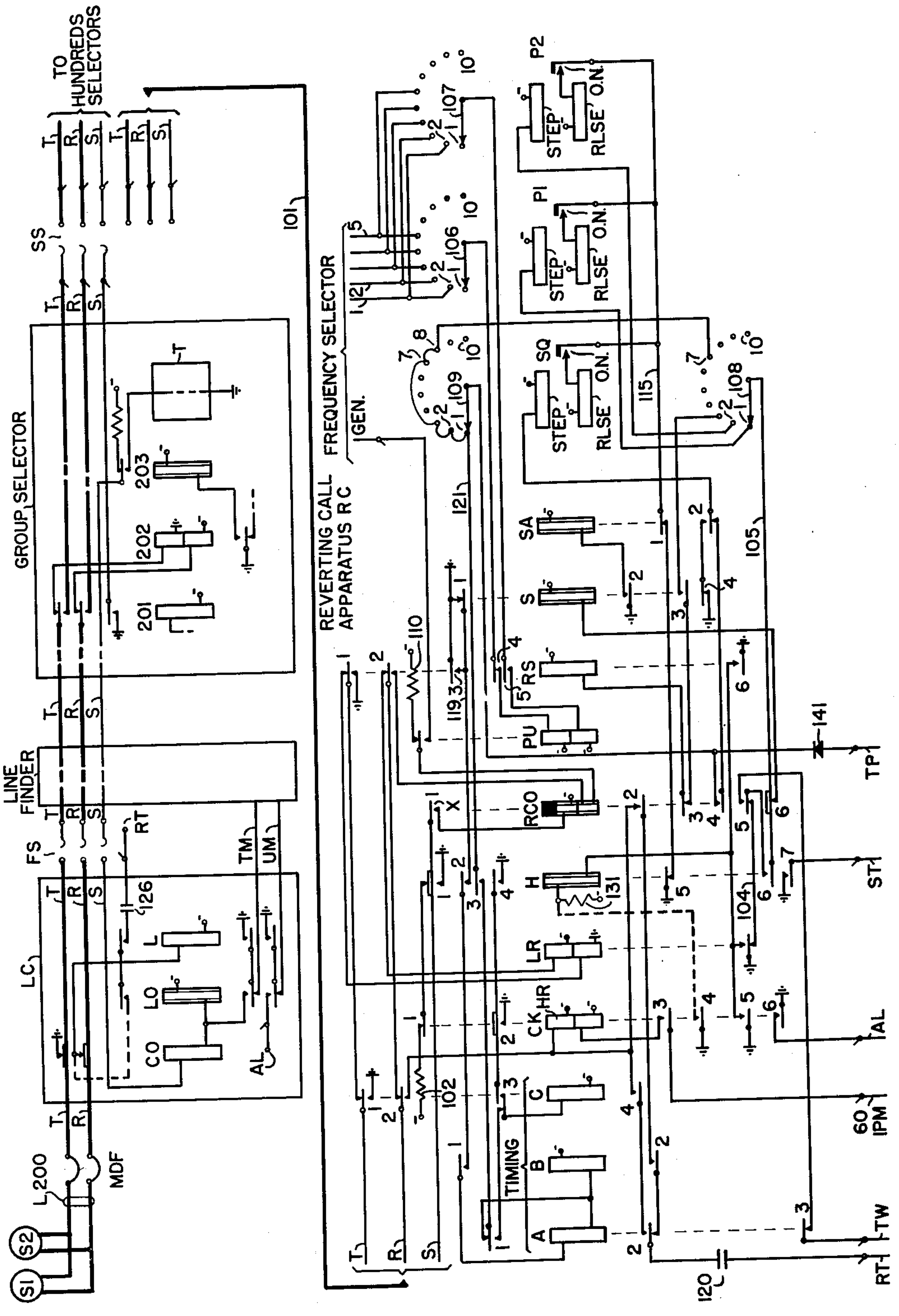

United States Patent Office 3,056,859

Patented Oct. 2, 1962

3,056,859

CONVERSATION-TIMING REVERTING-CALL TELEPHONE SYSTEM

Robert W. Hutton, Chicago, Ill., assignor to International Telephone and Telegraph Corporation, New York, N.Y., a corporation of Maryland Filed Jan. 22, 1957, Ser. No. 635,285
1 Claim. (Cl. 179—17)

This invention relates to a conversation-timing reverting-call telephone system. Its principal object is to provide conversation-timing arrangements for reverting calls in a telephone system having conventional line lockout provisions.

In telephone systems of the above character, three-relay line circuits are provided comprising the usual line and cutoff relays and a slow-releasing lockout relay serially related with the cutoff relay. After call initiation, if the cutoff relay is released at a time when the line conductors are bridged, shorted, or grounded, the line relay operates and maintains the slow-releasing lockout relay operated, placing the line circuit in a lockout condition which frees the seized switching apparatus; disables the call-initiating apparatus; and effects a trouble alarm. When lockout line circuits are provided for party lines, use is made of the lockout provisions to permit conversation on calls between two stations on the same line without switching apparatus being involved, the locked-out line circuit supplying transmitter current.

In known telephone systems employing lockout line circuits for party lines, a reverting-call switch or connector is used on calls between two stations on the same line to select and signal the called party. This reverting call apparatus is arranged to release when the called party answers and to restore the cutoff relay of the pertaining line circuit to lock out the line, conversation being permitted while the line is locked out, with no timing restrictions thereon. In these systems, timing arrangements for reverting calls are impractical as timing restrictions on reverting calls are also placed on the trouble lockout alarms since the line circuits cannot discriminate between a reverting call and a line fault.

According to one embodiment of the present invention, the noted impracticability of providing conversation timing on reverting calls is overcome by providing arrangements for holding the reverting-call apparatus as long as the line remains in a calling condition, and for increasing the line resistance and applying a masking tone to the line conductors after the normally allotted conversation period has expired to prevent any further conversation. When the line is thereafter cleared, by disconnect of both parties, the switching apparatus is released without the line being locked-out as no calling condition then exists on the line.

According to a second embodiment of the invention, the reverting-call apparatus is held until the conversation timing period has elapsed, whereupon the line becomes locked out in the normal manner but continued conversation thereover is prevented by a masking tone being applied to the line conductors from the associated line circuit.

The above-mentioned and other features and objects of this invention and the manner of attaining them will become more apparent and the invention itself will be best understood, by reference to the following description of two embodiments of the invention taken in conjunction with the accompanying drawing wherein reverting-call apparatus is shown which is accessible from a calling party line through the well-known line and selector stages. The dashed lines appearing in line circuit LC and reverting-call apparatus RC indicate circuitry present only in conjunction with the second embodiment of the invention.

Referring now in particular to the line and selector stages, only one party line L200 is shown, it having stations such as S1 and S2, connected thereto, and it is provided with a conventional lockout line circuit LC having a line relay L, a cutoff relay CO, and a lockout relay LO. The line circuit is connected to a set of switch contacts in the bank of each of the group of line finders, of which only one is shown, these finders being of any convenient construction suitable for extending calling lines to idle group selectors.

In the disclosed embodiments of my invention, the line finder is the conventional step-by-step finder and will not be described in detail. Similarly, the group selector is a conventional one or two digit dial-operated step-by-step selector of the two-motion type and is shown in block form, some associated control relays being shown in detail. The group selector has a plurality of revertive call equipments connected to sets of switching contacts in its bank, equipment RC being the only one shown. The reverting-call equipments are connected to the group selector bank over conductors in cable group 101.

When a subscriber at station S1 originates a call, line relay L operates, and call-initiating contacts thereon cause line-finder action which extends the calling line to an idle selector in the well-known manner. At such time relay 202 operates and operates relay 203 to cause ground to be placed on the sleeve conductor S to operate the cutoff relay CO and lockout relay LO in series, and to hold the finder switching apparatus operated. The line relay L is released by contacts on the cutoff relay CO and dial tone is returned to the calling subscriber.

If the calling subscriber fails to dial the digits of the desired number within 2 to 4 minutes, timer T removes ground from the sleeve conductor S, thereby open-circuiting relays CO and LO and releasing the line finder switch. At such time, with the line loop still bridged, relay CO restores and relay L reoperates before the lockout relay LO restores, placing the line circuit in a lockout condition, as relay LO is locked under control of relay L. When the called calling party thereafter terminates the call, line relay L restores and releases lockout relay LO, restoring the line circuit LC to its normal illustrated position.

If line-finder action were caused by a line fault, such as a shorted or grounded line, the selector times out as described and places the line in a lockout condition. Contacts on relays L and LO ground wire AL indicating a lockout alarm condition which results in line tests being made by the wire chief to determine whether the line is locked out from a reverting call or a line fault.

In the event that the calling subscriber dials the digits assigned reverting-call circuit RC, the group selector connects the calling line to the sets of terminal contacts in the bank assigned the reverting call circuit, thereupon closing the line loop across the battery and ground connected windings of line relay LR in reverting-call equipment RC.

The reverting call apparatus RC comprises, in addition to a number of control relays, three step-by-step well-known "minor" switches SQ, P1 and P2. The contacts on the banks of switches P1 and P2 are connected to frequency selecting wires F1 to F5, timing apparatus (not shown) grounding these wires in succession coincidental with applying a corresponding frequency to the generator wire GEN, as will be described hereinafter.

When the reverting-call apparatus RC is seized, as described, relay LR operates and operates relay H which prepares an impulsing circuit for switches P1 and P2, replaces idle-indicating battery potential on the sleeve conductor S with ground potential to hold the established connection, and grounds the start wire ST in preparation for starting the timing and ringing apparatus.

The calling party now dials the party digit assigned his station followed by the party digit assigned the called station. It is assumed that the stations on each party line have ringers tuned to the frequency corresponding to the stations and having corresponding party codes. For example, station S1 has its ringer tuned to frequency F1 and is assigned party digit "1," station S2 has its ringer tuned to frequency F2 and is assigned party digit "2," and so forth.

Relay LR restores and reoperates for each impulse in the series constituting the party digit "1" assigned to the calling station and delivers a stepping impulse, over wires 104 and 105, to relay S and through make contacts 1 of switch SQ to the stepping magnet of switch P1, causing it to advance its brush 106 to wire F1 associated with the contact bank thereof. At the same time, relay S operates and operates relay SA.

After the single impulse is delivered, line relay LR comes to rest operated, removing ground from relay S and switch P1. A short time thereafter, relay S restores and open-circuits slow-restoring relay SA, which restores a short time later. During the interval that relay S is operated and relay SA is restored, ground potential is extended through break contacts 4 of relay S and make contacts of relay SA to the stepping magnet of switch SQ causing it to advance its brushes 108 and 109 to the next position, thereby connecting wire 105 to the stepping magnet of switch P2.

Relay LR restores for each impulse in the digit series comprising the second digit, thereby delivering two ground impulses over wires 104 and 105 to the stepping magnet of switch P2 and to relay S, causing switch P2 to advance its brush 107 to make connection with wire F2, corresponding to station frequency of the ringer of station S2, and operating relay S.

Following the termination of the dialing of the second digit, relays S and SA restore in succession to deliver another stepping impulse to switch SQ, causing it to advance its brushes 108 and 109 to the next position.

Following the dialing of both the calling and called party codes, a well-known reverting call tone is placed on the line (by circuitry not shown) to inform the calling party that the line should be cleared for ringing purposes.

Upon receipt of the noted tone, the calling party replaces his handset, thus opening the circuit to relay LR which restores and grounds wire 104, which is now connected to the battery-connected winding of relay RS through brush 108 and contacts 3 of relays S and RCO.

Relay RS operates, and its contacts 6 maintain relay H operated; its contacts 1 and 2 transfer the tip and ring conductors from the windings of relay LR to ground at contacts 1 of relay RS and to battery through the lower winding of relay RCO and resistor 110; and its contacts 4 and 5 connect the battery-connected windings of relay PU to brushes 106 and 107 of switches P1 and P2.

The frequency-selecting conductors F1 to F5 and the generator lead GEN are controlled by a ringing interrupter, this interrupter being of the well-known type which places ground potential on the wires F1 to F5 in succession, and at the same time applies a corresponding ringing frequency to the generator lead GEN. Thus, at the time that ground appears on the wire F1, ringing frequency GEN–1 is applied to generator lead GEN; at the time ground appears on wire F2, ringing frequency GEN–2 is applied to wire GEN; and so forth.

When ground appears on wire F1 it is extended through brush 106 and contacts 4 of relay RS to operate pickup relay PU. Contacts on relay PU connect the generator lead GEN having ringing frequency GEN–1 appearing thereon to the ring conductor R through the lower winding of ring cutoff relay RCO and contacts 2 of relay RS.

With the tip conductor grounded at make contacts 1 of relay RS, station S1 is signalled. A short time thereafter, the ground on wire F1 is removed and relay PU restores, returning the line conductors to battery and ground as hereinbefore noted for well-known ring-trip purposes. A short time thereafter, the ringing interrupter grounds wire F2, which operates relay PU to connect the generator wire GEN to the line conductors to apply ringing frequency GEN–2 thereto to signal station S2. A short time thereafter, ground is removed from wire F2 and relay PU restores, removing ringing current from the called line.

The ringing interrupter successively grounds the remaining wires F3 to F5, but since the brushes of switches P1 or P2 are not in contact therewith, no ringing current is applied to the line. Later, wires F1 and F2 are grounded again to reapply frequencies GEN–1 and GEN–2 to the called line. Thus the called and calling stations are rung alternately, these operations continuing until either the called party answers the call or the calling party removes his handset to trip the ringing to cancel the call. If the calling party abandons the call and ringing continues, the connection is thereafter forcibly released by the timing apparatus as will be explained.

As is well-known, the purpose of ringing the calling station as well as the called station is to inform the calling party after he has replaced his handset that the called station is in fact being rung and to indicate, by termination of ringing, that the called party has answered.

If the called party lifts his handset to answer the call, a loop is closed across the line conductors and the ringing is terminated. If the call is answered during the silent period, trip battery is supplied from resistor 110, and if answered during the ringing period, trip battery is supplied from the generator lead GEN. In either event, relay RCO operates in response to the current flow through its lower winding and at its make-first contacts 1 locks operated. Contacts 3 of relay RCO open-circuit relay RS; contacts 6 open-circuit relay S, and contacts 4 and 5 prepare timing control paths.

Relay RS restores, and its contacts 1 and 2, reconnect the line loop across the battery and ground connected windings of line relay LR; its make contacts 3 restore the timing relays A and B, if operated; its contacts 4 and 5 prevent any further application of ringing current to the called line; and its contacts 6 place relay H again under control of relay LR or CK. Line relay LR reoperates and maintains relay H operated. Relay 8 restores after a short delay and open-circuits relay SA, as hereinbefore described, to deliver a stepping impulse to switch SQ causing it to advance its brush 109 to switch position 4.

The calling party, upon observing that ringing has ceased, also lifts his handset and converses with the called party, the transmitter current supply being furnished from relay LR.

At the end of the conversation, when both parties have replaced their handsets, relays LR and H are restored closing a circuit for the release magnet of each of the switches SQ, P1 and P2. This circuit includes the off-normal contacts ON of all switches and the ground on wire 115 which originates at contacts 5 of relay H. Ground is also removed from sleeve conductor S, releasing the line finder and the group selector in the well-known manner, no line lockout condition occurring as the line conductors are now open.

The operation of the reverting-call apparatus RC with respect to timing functions will now be described.

Timing apparatus (not shown) is arranged to deliver a momentary pulse of ground on wire TP in regular two-minute intervals, and to deliver a momentary pulse of ground on the wire TW one-half minute before each appearance of ground on wire TP.

If the calling party does not dial after seizure of apparatus RC, ground appears on wire TP and is extended to the battery-connected winding of timing relay B through rectifier 141, brush 109, wire 121, and contacts on relay H. Relay B operates and, upon termination of the pulse of ground on wire TP, is locked operated in series with relay A to grounded wire 119 through contacts 1 of relay B and contacts 2 of relay H. If the calling party does not dial for two minutes thereafter, ground again appears on wire TP and is extended to the winding of relay C to initiate the clearing out of the apparatus for failure to dial by the calling subscriber. Relay C operates and at contacts 1 and 2 transfer the tip and ring conductors from relay LR to a high resistance bridge including the high resistance winding of the relay CK which substantially reduces the talking current supply to the calling line. At the same time, conversation-masking ringing tone or generator current from wire RT is extended through condenser 120, contacts 2 of relay A, and make contacts 4 of relay C to the ring conductor R. The calling subscriber thus will be signalled to disconnect.

Responsive to disconnect by the calling line after receipt of such tone, relay CK restores and open-circuits relay H. Relay H upon restoring removes ground from the sleeve conductor S thereby releasing the line finder and group selector equipment. Cutoff relay CO and lockout relay LO are restored in succession, no lockout occurring since the line is not bridged.

In order to insure that the calling subscriber, after replacing his receiver, cannot judge the precise interval when the cutoff relay is restored and the slow-operating lockout relay is yet operated so that removal of the handset causes the line to go into a lockout condition with no timing provisions thereon, contacts 3 of relay CK connect a 60 i.p.m. ground-impulsing source to the lower winding of relay CK, thereby varying the time interval when ground is removed from the sleeve. If the calling subscriber disconnects at the time ground appears on wire 60 i.p.m., extending to the lower winding of relay CK, relay CK is held operated until such pulse has terminated, this varying the release time of relay CK from 0 to 500 milliseconds, depending upon the position of the 60 i.p.m. interrupter when the calling subscriber releases.

If the calling subscriber dials the party digit before the noted second impulse of ground appears on wire TP, relay S operates and removes ground from wire 119, thereby restoring relays A and B to start a new timing interval. In a like manner, the interval between the first and second digits, the interval between the dialing of the second digit and replacing the handset in order to start ringing, and the interval during which ringing current is placed on the line, are all timed in the manner above described.

If the called or calling party removes the handset at his station, in response to ringing signals, a new timing period is started by the restoration of relay RS, which ungrounds wire 119, prior to the release of slow-releasing relay S. At such time, wire TP is connected through make contacts 4 of relay RCO and break contacts on relay SA to the stepping magnet of sequence switch SQ, and is also connected to brush 109 of switch SQ as before noted. The two-minute pulses of ground on wire TP advance switch SQ step-by-step, but do not operate relays A or B as brush 109 is positioned on unconnected bank contacts of switch SQ. Upon the completion of the third timing step, covering a time interval of 4 to 6 minutes, after the called parties have answered, switch SQ has its brushes 108 and 109 positioned on switch bank contact 7. Ground on time-warn lead TW, appearing one and one-ralf minutes after switch SQ is advanced to position 7, is extended through break contacts 3 of relay A, make contacts 5 of relay RCO, make contacts 6 of relay H, wire 105, brush 108, and wire 121 to the battery-connected winding of the timing relay B, operating it. While timing relay B is operated and before relay A operates in series therewith on termination of the TW pulse, ring tone is extended through break contacts 2 of relay A, make contacts 2 of relay B, and make contacts 2 of relay RCO to the ring conductor R to inform the calling subscriber that the conversation period allotted the pertaining call is to be terminated in one-half minute.

Upon termination of the time warn pulse, relay A operates in series with relay B, removes the warning tone, and prepares an operate circuit for relay C. Responsive to the appearance of ground on wire TP, switch SQ is advanced one step to position 8 and extends ground through contacts 4 of relay RCO and brush 109 to wire 121 to operate relay C. Contacts on relay C operate relay CK which increases the loop resistance and causes a masking tone to be applied to the line conductors, as hereinbefore described, to prevent any further conversation.

A short time thereafter, the calling and called parties disconnect and ground is removed from the sleeve to clear out the connection as hereinbefore described, without the line circuit assuming a lockout condition.

In the second embodiment of the invention, the reverting-call apparatus is modified by the addition of resistor 131 to cause restoration of relay H when relay CK operates to cause the line to locked-out when the timing period has expired, and the line circuit is modified so that ringing tone is applied to the ring conductor R when the line is so locked out.

If the calling subscriber fails to dial, following the seizure of the group selector, ground is removed from the sleeve conductor S by timer T, placing the line in lockout condition, as hereinbefore described. At such time, ring tone is extended through tone condenser 126 and through make contacts on relays L and LO to the ring conductor thereby applying a masking tone to the line.

If the lockout condition is caused by a "permanent," such as the ring side of the line becoming grounded or the line conductor becoming shorted, ring tone appearing on the calling line does not interfere with the alarm signalling provisions as ground appears on the alarm wire AL in the normal manner.

On conversation-timed reverting-call connections, the noted operation of relay C to terminate conversation by increasing the loop resistance and applying a masking tone to the line, operates relay CK which at its contacts 4 short-circuits relay H, causing it to release and to remove ground from the sleeve conductor S, causing the line circuit to go into a lockout condition. The locked-out line circuit places a masking tone on the line, as before noted for line permanents, to prevent further conversation. Thus, in the second embodiment, the reverting-call apparatus is immediately restored upon timing out and the masking tone is supplied from the locked-out line circuit.

While I have described above the principles of my invention in connection with specific apparatus it is to be clearly understood that this description is made only by way of example and not as a limitation to the scope of my invention.

I claim:

In a common-battery telephone switching system, common-battery party lines each having a plurality of stations thereon; reverting-call apparatus, switching apparatus common to the lines and controlled from any calling station thereon, on reverting calls to other stations on the same line, for extending a connection from the calling station to the reverting-call apparatus, means in the reverting-call apparatus for signalling the called station according to calling station control and for supplying direct current flow over the calling line to hold the said connection and to enable conversation between the calling and called stations, disabling means for preventing conversation between the said calling and called stations, and timing means operated responsive to the answer of a reverting call by one station for operating the said disabling means after a predetermined time period to disable conversation between said calling and called stations, individual line equipments for the respective party lines each including means for locking the associated line out of normal service, a conversation-masking tone source, means in the line equipment of any locked out line for connecting the said tone source to the calling line and for barring access by the locked out line to any of said common switching apparatus, and means controlled by the said operation of the disabling means for controlling the said lockout means.

References Cited in the file of this patent

UNITED STATES PATENTS

| | | |
|---|---|---|
| 1,671,146 | Crocker | May 29, 1928 |
| 2,218,850 | Mahoney et al. | Oct. 22, 1940 |
| 2,809,235 | Trousdale | Oct. 8, 1957 |
| 2,889,407 | Trousdale | June 2, 1959 |